(12) United States Patent
Chehab

(10) Patent No.: US 12,528,125 B2
(45) Date of Patent: *Jan. 20, 2026

(54) METHOD FOR MANUFACTURING AN ALUMINUM ALLOY PART

(71) Applicant: C-TEC Constellium Technology Center, Voreppe (FR)

(72) Inventor: Bechir Chehab, Voiron (FR)

(73) Assignee: C-TEC Constellium Technology Center, Voreppe (FR)

( * ) Notice: Subject to any disclaimer, the term of this patent is extended or adjusted under 35 U.S.C. 154(b) by 781 days.

This patent is subject to a terminal disclaimer.

(21) Appl. No.: 17/430,650

(22) PCT Filed: Feb. 13, 2020

(86) PCT No.: PCT/FR2020/050264
§ 371 (c)(1),
(2) Date: Aug. 12, 2021

(87) PCT Pub. No.: WO2020/165542
PCT Pub. Date: Aug. 20, 2020

(65) Prior Publication Data
US 2022/0213579 A1 Jul. 7, 2022

(30) Foreign Application Priority Data

Feb. 15, 2019 (FR) ........................................ 1901575

(51) Int. Cl.
*C22C 1/04* (2023.01)
*B22F 1/06* (2022.01)
(Continued)

(52) U.S. Cl.
CPC .............. *C22C 1/0416* (2013.01); *B22F 1/06* (2022.01); *B22F 10/64* (2021.01); *B23K 26/342* (2015.10);
(Continued)

(58) Field of Classification Search
CPC ......... C22C 1/0416; C22C 21/00; B22F 1/06; B22F 10/64; B22F 10/25; B22F 10/28;
(Continued)

(56) References Cited

U.S. PATENT DOCUMENTS 11,692,240 B2 * 7/2023 Chehab .................. C22C 21/00
419/26
2010/0143177 A1 6/2010 Pandey
(Continued)

FOREIGN PATENT DOCUMENTS

DE 102007018123 A1 10/2008
EP 0675209 A1 10/1995
(Continued)

OTHER PUBLICATIONS

JPH07278713A machine translation. (Year: 1995).*
(Continued)

*Primary Examiner* — John A Hevey
(74) *Attorney, Agent, or Firm* — McBee Moore & Vanik IP, LLC

(57) ABSTRACT

The invention relates to a method for manufacturing a part including a formation of successive solid metallic layers, superimposed on one another. The invention also relates to a part obtained by this method. The alloy used in the additive manufacturing method according to the invention, allows obtaining parts with remarkable features.

15 Claims, 1 Drawing Sheet

(51) Int. Cl.
  *B22F 10/25*    (2021.01)
  *B22F 10/28*    (2021.01)
  *B22F 10/36*    (2021.01)
  *B22F 10/364*   (2021.01)
  *B22F 10/64*    (2021.01)
  *B23K 26/342*   (2014.01)
  *B33Y 10/00*    (2015.01)
  *B33Y 40/20*    (2020.01)
  *B33Y 70/00*    (2020.01)
  *C22C 21/00*    (2006.01)
  *C22F 1/04*     (2006.01)
  *B23K 103/10*   (2006.01)

(52) U.S. Cl.
  CPC ............... *B33Y 10/00* (2014.12); *B33Y 40/20* (2020.01); *B33Y 70/00* (2014.12); *C22C 21/00* (2013.01); *C22F 1/04* (2013.01); *B22F 10/25* (2021.01); *B22F 10/28* (2021.01); *B22F 10/36* (2021.01); *B22F 10/364* (2021.01); *B22F 2301/052* (2013.01); *B23K 2103/10* (2018.08)

(58) Field of Classification Search
  CPC .. B22F 10/36; B22F 10/364; B22F 2301/052; B22F 3/15; B22F 9/082; B22F 2003/1051; B22F 2003/248; B22F 3/105; B22F 2998/10; B23K 26/342; B23K 2103/10; B33Y 10/00; B33Y 40/20; B33Y 70/00; B33Y 80/00; C22F 1/04; Y02P 10/25
  See application file for complete search history.

(56) References Cited

U.S. PATENT DOCUMENTS

| | | | |
|---|---|---|---|
| 2017/0016093 A1 | 1/2017 | Karlen et al. | |
| 2017/0211168 A1 | 7/2017 | Liu et al. | |
| 2018/0051748 A1* | 2/2018 | Campbell | B32B 15/20 |
| 2019/0309402 A1* | 10/2019 | Karabin | C22C 21/02 |
| 2020/0063241 A1* | 2/2020 | Adachi | C22C 21/00 |
| 2020/0199716 A1* | 6/2020 | Schaedler | C22C 21/12 |
| 2020/0370149 A1* | 11/2020 | Gong | C22C 1/0416 |
| 2021/0156005 A1 | 5/2021 | Chehab et al. | |
| 2021/0269896 A1* | 9/2021 | Chehab | C22C 21/00 |
| 2021/0276099 A1* | 9/2021 | Chehab | B33Y 10/00 |
| 2022/0119926 A1* | 4/2022 | Chehab | B33Y 10/00 |
| 2022/0126367 A1* | 4/2022 | Chehab | C22C 1/0416 |
| 2023/0191488 A1* | 6/2023 | Chehab | B22F 1/05 75/238 |
| 2023/0191489 A1* | 6/2023 | Chehab | B33Y 70/00 264/497 |

FOREIGN PATENT DOCUMENTS

| | | | | |
|---|---|---|---|---|
| EP | 2796229 A1 | 10/2014 | | |
| EP | 2924137 A1 | 9/2015 | | |
| EP | 3026135 A1 | 6/2016 | | |
| EP | 3406372 A1 | 11/2018 | | |
| JP | H07278713 A | * 10/1995 | | |
| WO | 2015006447 A1 | 1/2015 | | |
| WO | 2016209652 A1 | 12/2016 | | |
| WO | 201800935 A1 | 4/2018 | | |
| WO | 2018119283 A1 | 6/2018 | | |
| WO | 2018206876 A1 | 11/2018 | | |
| WO | WO-2018198534 A1 | * 11/2018 | | B22F 10/10 |
| WO | 2019108596 A1 | 6/2019 | | |
| WO | 2019155180 A1 | 8/2019 | | |

OTHER PUBLICATIONS

International Search Report for International Patent Application No. PCT/FR2020/050264 dated Jun. 24, 2020.

French Search Report for French Patent Application No. 1901575 dated Oct. 17, 2019.

Sun et al., Microstructure and mechanical properties of Al—Fe—V—Si aluminum alloy produced by electron beam melting. Materials Science & Engineering A, Apr. 6, 2016, pp. 207-214, vol. 659.

* cited by examiner

[Fig 1]
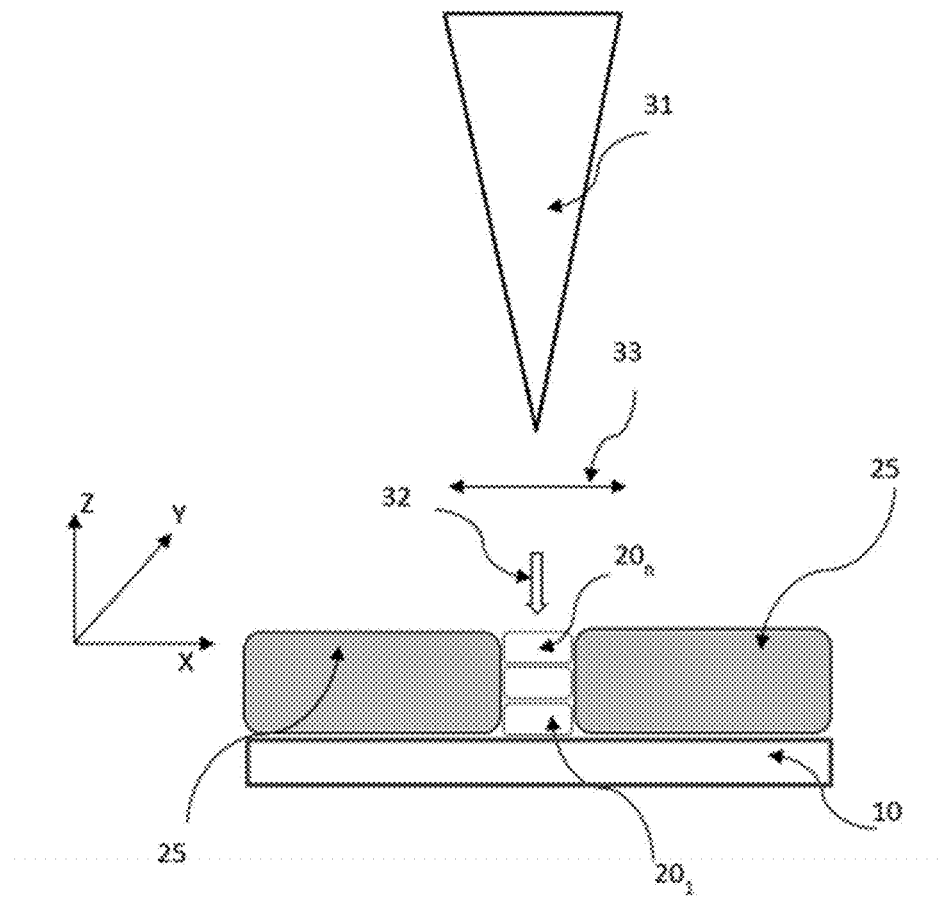
[Fig. 2]
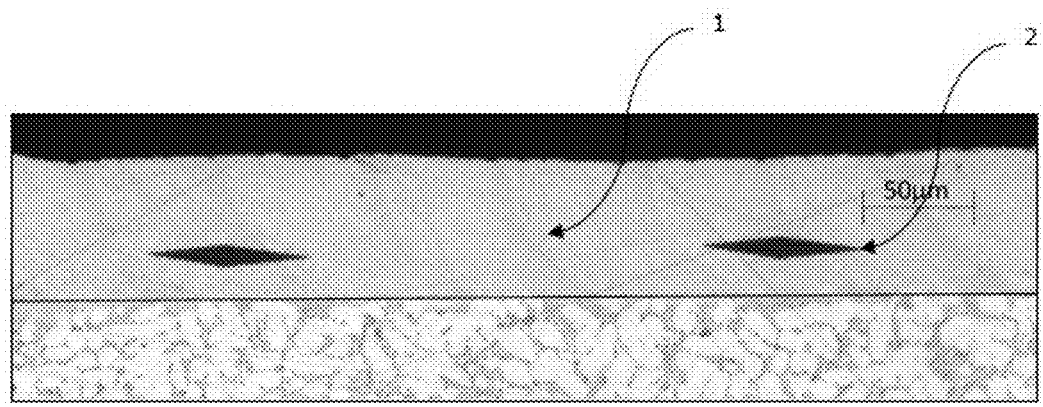

METHOD FOR MANUFACTURING AN ALUMINUM ALLOY PART

CROSS-REFERENCE TO RELATED APPLICATIONS

This application is the National Stage entry of International Application No. PCT/FR2020/050264, filed 13 Feb. 2020, which claims priority to France No. 1901575, filed 15 Feb. 2019.

BACKGROUND

Technical Field

The technical field of the invention is a method for manufacturing a part made of an aluminum alloy, implementing an additive manufacturing technique.

Description of Related Art

Since the 80s, additive manufacturing techniques have been developed. These consist in shaping a part by addition of matter, which is in contrast with machining techniques, aiming to remove the matter. Formerly restricted to prototyping, additive manufacturing is now operational for manufacturing industrial products in mass production, including metallic parts.

The term "additive manufacturing" is defined, according to the French standard XP E67-001, as a "set of processes allowing manufacturing, layer after layer, by addition of matter, a physical object based on a digital object". The standard ASTM F2792 (January 2012) defines additive manufacturing too. Different additive manufacturing approaches are also defined and described in the standard ISO/ASTM 17296-1. Resort to an additive manufacture to make an aluminum part, with low porosity, has been described in the document WO2015/006447. In general, the application of successive layers is carried out by application of a so-called filler material, and then melting or sintering of the filler material using an energy source such as a laser beam, an electron beam, a plasma torch or an electric arc. Regardless of the additive manufacturing approach that is applied, the thickness of each added layer is in the range of a few tens or hundreds of microns.

An additive manufacturing means is the melting or sintering of a filler material in the form of a powder. This may consist of melting or sintering by an energy beam.

In particular, selective laser sintering (SLS or direct metal laser sintering, DMLS) techniques are known, wherein a layer of a metal or metallic alloy powder is applied on the part to be manufactured and is selectively sintered according to the digital model with thermal energy from a laser beam. Another type of metal forming processes comprises selective laser melting (SLM) or electron beam melting (EBM), wherein the thermal energy supplied by a laser or a directed electron beam is used to selectively melt (instead of sintering) the metallic powder so it melts as it cools down and solidifies.

Laser melting deposition (LMD) is also known wherein the powder is simultaneously projected and molten by a laser beam.

The patent application WO2016/209652 describes a method for manufacturing an aluminum with a high mechanical strength comprising: the preparation of an atomized aluminum powder having one or several desired approximate powder size(s) and an approximate morphology; sintering of the powder to form a product by additive manufacturing; solution heat treating; quenching; and tempering of the aluminum manufactured in an additive fashion.

The patent application EP2796229 discloses a method for forming an aluminum metallic alloy reinforced by dispersion comprising the steps consisting in: obtaining, in the form of a powder, an aluminum alloy composition that could acquire a reinforced microstructure by dispersion; directing a laser beam with low energy density on a portion of the powder having the composition of the alloy; removing the laser beam off the portion of the powder alloy composition; and cooling down the portion of the powder alloy composition at a rate higher than or equal to about $10^{6\circ}$ C. per second, thereby forming the aluminum metallic alloy reinforced by dispersion. The method is particularly suited for an alloy having a composition according to the following formula: $Al_{comp}Fe_aSi_bX_c$, wherein X represents at least one element selected from the group constituted by Mn, V, Cr, Mo, W, Nb and Ta; "a" ranges from 2.0 to 7.5% in atoms; "b" ranges from 0.5 to 3.0% in atoms; "c" ranges from 0.05 to 3.5% in atoms; and the remainder is aluminum and accidental impurities, provided that the ratio [Fe+Si]/Si falls within the range of about 2.0:1 to 5.0:1.

The patent application US2017/0211168 discloses a method for manufacturing a light and resistant alloy, efficient at high temperature, comprising aluminum, silicon, and iron and/or nickel.

The patent application EP3026135 describes a molding alloy comprising 87 to 99 parts by weight of aluminum and silicon, 0.25 to 0.4 parts by weight of copper and 0.15 to 0.35 parts by weight of a combination of at least two elements amongst Mg, Ni and Ti. This molding alloy is adapted to be scattered by an inert gas to form a powder, the powder being used to form an object by additive manufacturing by laser, the object being then subjected to a tempering treatment.

The publication "Characterization of Al—Fe—V—Si heat-resistant aluminum alloy components fabricated by selective laser melting", Journal of Material Research, Vol. 30, No. 10, May 28, 2015, describes the manufacture by SLM of heat-resistant components with a composition, in weight %, Al-8.5Fe-1.3V-1.7Si.

The publication "Microstructure and mechanical properties of Al—Fe—V—Si aluminum alloy produced by electron beam melting", Materials Science & Engineering A659 (2016)207-214, describes parts made of the same alloy as in the previous article obtained by EBM.

There is an increasing need for high-resistant aluminum alloys for the SLM application. The 4xxx alloys (mainly Al10SiMg, Al7SiMg and Al12Si) are the most mature aluminum alloys for the SLM application. These alloys feature a very good fitness for the SLM process but suffer from limited mechanical properties.

Scalmalloy® (DE102007018123A1) developed by APWorks features (with a post-manufacture heat treatment of 4 h at 325° C.) good mechanical properties at room temperature. However, this solution in the form of a powder suffers from a high cost related to its high scandium content (~0.7% Sc) and to the necessity of a specific atomization process. This solution also suffers from poor mechanical properties at high temperature, for example higher than 150° C.

Addalloy™ developed by NanoAl (WO201800935A1) consists of an Al Mg Zr alloy. This alloy suffers from limited mechanical properties with a hardness peak of about 130 HV.

An alloy described in the patent application EP2924137 of RHEINFELDEN ALLOYS GMBH is also known, which comprises, in weight percents, from 1 to 6% of nickel, from 1 to 5% of manganese, from 0.1 to 0.4% of zirconium, from 0.1 to 0.4% of vanadium, from 0.1 to 1% of tungsten and/or from 0.1 to 1% of molybdenum. This patent application also relates to a casting alloy and does not mention additive manufacturing.

The mechanical properties of the aluminum parts obtained by additive manufacturing depend on the alloy forming the filler metal, and more specifically on its composition, the parameters of the additive manufacturing process as well as the applied heat treatments. The inventors have determined an alloy composition which, when used in an additive manufacturing method, allows obtaining parts with remarkable characteristics. In particular, the parts obtained according to the present invention have improved characteristics in comparison with the prior art (in particular a 8009 alloy), in particular in terms of hot hardness (for example after 1 h at 400° C.).

SUMMARY

A first object of the invention is a method for manufacturing a part including a formation of successive solid metallic layers, superimposed on one another, each layer describing a pattern defined from a digital model, each layer being formed by the deposition of a metal, called filler metal, the filler metal being subjected to an energy input so as to melt and constitute, when solidifying, said layer, wherein the filler metal is in the form of a powder, whose exposure to an energy beam results in melting followed by solidification so as to form a solid layer, the method being characterized in that the filler metal is an aluminum alloy comprising at least the following alloy elements:

Ni, according to a weight fraction from 1 to 8%, preferably from 2 to 7%;

Zr, according to a weight fraction from 0.3 to 3%, preferably from 0.5 to 2.5%;

optionally V, according to a weight fraction from 0 to 4%, preferably from 0.5 to 2%;

optionally Cu, according to a weight fraction from 0 to 7%, preferably from 2 to 7%;

optionally Fe, according to a weight fraction from 0 to 3%, preferably from 0.5 to 3%.

It should be noted that the alloy according to the invention may also comprise:

impurities according to a weight fraction lower than 0.05% for each one (namely 500 ppm) and lower than 0.15% all in all;

the remainder consisting of aluminum.

BRIEF DESCRIPTION OF THE DRAWINGS

FIGS. 1-2 depict embodiments as described herein.

DETAILED DESCRIPTION OF A PREFERRED EMBODIMENT

Preferably, the alloy according to the present invention comprises a weight fraction of at least 85%, more preferably of at least 90%, of aluminum.

Melting of the powder may be partial or total. Preferably, from 50 to 100% of the exposed powder melts, more preferably from 80 to 100%.

In particular, each layer may feature a pattern defined from a digital model.

Without being bound by theory, the alloys according to the invention seem to be particularly advantageous by having a good trade-off at room temperature between the (thermal or electrical) conductivity and the mechanical strength.

In particular, in the presence of Zr, the (electrical or thermal) conductivity of the alloys according to the invention at ambient temperature seems to continuously increase with the duration of holding at the annealing temperature for example at 400° C. This is not the case for the mechanical strength at room temperature. Thus, depending on the pursued trade-offs, the time of holding at the annealing temperature seems to require adjustment.

The annealing temperature may be from 300 to 500° C.

The presence of Ni in the alloys according to the invention is particularly advantageous, it allows improving the processability of the alloys by reducing the sensitivity to cracking during the SLM process.

Optionally, the alloy may also comprise at least one element selected from: Si, Hf, Cr, Ti, Sc, Mg, Er, W, Nb, Ta, Y, Yb, Nd, Mn, Ce, Co, La, Mo and/or a mischmetal, according to a weight fraction lower than or equal to 5%, preferably lower than or equal to 3% for each one, and lower than or equal to 15%, preferably lower than or equal to 12%, still more preferably lower than or equal to 5% all in all. In a manner known to those skilled in the art, the composition of the mischmetal generally consists of about 45 to 50% of cerium, 25% of lanthanum, 15 to 20% of neodymium and 5% of praseodymium.

These elements may lead to the formation of dispersoids or fine intermetallic phases allowing increasing the hardness of the obtained material.

However, in one embodiment, the addition of Ce, a mischmetal, Mg, Mn, Cr, Mo, Sc, Er, Nb, Yb, Y, Ta, Nd, W, Co, La, Si and/or Zn is avoided, the preferred weight fraction of each of these elements then being lower than 0.05%, and preferably lower than 0.01%.

In another embodiment, the aluminum alloy comprises at least one amongst V, Cu and Fe, in the proportions as defined in the present description.

In another embodiment, when La is present, then the addition of Mn is avoided, the preferred weight fraction of Mn then being lower than 0.05%, and preferably lower than 0.01%.

In another embodiment, when Mn is present, then the addition of La is avoided, the preferred weight fraction of La then being lower than 0.05%, and preferably lower than 0.01%.

Optionally, the alloy may also comprise at least one element selected from: Sr, Ba, Sb, Bi, Ca, P, B, In and/or Sn, according to a weight fraction lower than or equal to 1%, preferably lower than or equal to 0.1%, still more preferably lower than or equal to 700 ppm for each one, and lower than or equal to 2%, preferably lower than or equal to 1% all in all. However, in one embodiment, the addition of Bi is avoided, the preferred weight fraction of Bi then being lower than 0.05%, and preferably lower than 0.01%.

Optionally, the alloy may also comprise at least one element selected from: Ag according to a weight fraction from 0.06 to 1%, Li according to a weight fraction from 0.06 to 1%, and/or Zn according to a weight fraction from 0.06 to 6%. These elements can act on the strength of the material by hardening precipitation or by their effect on the properties of the solid solution.

Optionally, the alloy may also comprise at least one element for refining the grains and avoiding a coarse columnar microstructure, for example AlTiC or AlTiB2 (for example in the AT5B or AT3B form), according to an amount smaller than or equal to 50 kg/ton, preferably smaller than or equal to 20 kg/ton, still more preferably smaller than or equal to 12 kg/ton for each one, and smaller than or equal to 50 kg/ton, preferably smaller than or equal to 20 kg/ton all in all.

According to one embodiment, the method may include, following the formation of the layers:
- a solution heat treatment followed by quenching and tempering, or
- a heat treatment typically at a temperature of at least 100° C. and at most 500° C.
- and/or a hot isostatic pressing (HIP).

In particular, the heat treatment may enable a relief of the residual stresses and/or an additional precipitation of hardening phases.

In particular, the HIP treatment may allow improving the elongation properties and the fatigue properties. The hot isostatic pressing may be carried out before, after or instead of the heat treatment.

Advantageously, the hot isostatic pressing is carried out at a temperature from 250° C. to 550° C. and preferably from 300° C. to 450° C., at a pressure from 500 to 3000 bars and over a duration from 0.5 to 10 hours.

According to another embodiment, suited to alloys with structural hardening, it is possible to carry out a solution heat treatment followed by quenching and tempering of the formed part and/or a hot isostatic pressing. In this case, the hot isostatic pressing may advantageously replace the solution heat treatment. However, the method according to the invention is advantageous because it preferably does not require any solution heat treatment followed by quenching. The solution heat treatment may have a detrimental effect on the mechanical strength in some cases by participating in an enlargement of dispersoids or fine intermetallic phases.

According to one embodiment, the method according to the present invention further includes, optionally, a machining treatment, and/or a chemical, electrochemical or mechanical surface treatment, and/or a vibratory finishing. In particular, these treatments may be carried out to reduce the roughness and/or improve the corrosion resistance and/or improve the resistance to fatigue cracking.

Optionally, it is possible to carry out a mechanical deformation of the part, for example after the additive manufacture and/or before the heat treatment.

A second object of the invention is a metallic part, obtained by a method according to the first object of the invention.

A third object of the invention is a powder comprising, preferably consisting of, an aluminum alloy comprising at least the following alloy elements:
- Ni, according to a weight fraction from 1 to 8%, preferably from 2 to 7%;
- Zr, according to a weight fraction from 0.3 to 3%, preferably from 0.5 to 2.5%;
- optionally V, according to a weight fraction from 0 to 4%, preferably from 0.5 to 2%;
- optionally Cu, according to a weight fraction from 0 to 7%, preferably from 2 to 7%;
- optionally Fe, according to a weight fraction from 0 to 3%, preferably from 0.5 to 3%.

It should be noted that the aluminum alloy of the powder according to the present invention may also comprise:
- impurities according to a weight fraction lower than 0.05% for each one (namely 500 ppm) and lower than 0.15% all in all;
- the remainder consisting of aluminum.

Preferably, the alloy of the powder according to the present invention comprises a weight fraction of at least 85%, more preferably of at least 90%, of aluminum.

The aluminum alloy of the powder according to the present invention may also comprise:
- optionally, at least one element selected from: Si, Hf, Cr, Ti, Sc, Mg, Er, W, Nb, Ta, Y, Yb, Nd, Mn, Ce, Co, La, Mo and/or a mischmetal, according to a weight fraction lower than or equal to 5%, preferably lower than or equal to 3% for each one, and lower than or equal to 15%, preferably lower than or equal to 12%, still more preferably lower than or equal to 5% all in all; and/or
- optionally, at least one element selected from: Sr, Ba, Sb, Bi, Ca, P, B, In and/or Sn, according to a weight fraction lower than or equal to 1%, preferably lower than or equal to 0.1%, still more preferably lower than or equal to 700 ppm for each one, and lower than or equal to 2%, preferably lower than or equal to 1% all in all. However, in one embodiment, the addition of Bi is avoided, the preferred weight fraction of Bi then being lower than 0.05%, and preferably lower than 0.01%; and/or
- optionally, at least one element selected from: Ag according to a weight fraction from 0.06 to 1%, Li according to a weight fraction from 0.06 to 1%, and/or Zn according to a weight fraction from 0.06 to 6%; and/or
- optionally, at least one element selected in order to refine the grains and avoid a coarse columnar microstructure, for example AlTiC or AlTiB2 (for example in the AT5B or AT3B form), according to an amount smaller than or equal to 50 kg/ton, preferably smaller than or equal to 20 kg/ton, still more preferably smaller than or equal to 12 kg/ton for each one, and smaller than or equal to 50 kg/ton, preferably smaller than or equal to 20 kg/ton all in all.

Preferably, the addition of Ce, a mischmetal, Mg, Mn, Cr, Mo, Sc, Er, Nb, Yb, Y, Ta, Nd, W, Co, La, Si and/or Zn is avoided, the preferred weight fraction of each of these elements then being lower than 0.05%, and preferably lower than 0.01%.

In one embodiment, the aluminum alloy comprises at least one amongst V, Cu and Fe, in the proportions as defined in the present description.

In another embodiment, when La is present, then the addition of Mn is avoided, the preferred weight fraction of Mn then being lower than 0.05%, and preferably lower than 0.01%.

In another embodiment, when Mn is present, then the addition of La is avoided, the preferred weight fraction of La then being lower than 0.05%, and preferably lower than 0.01%.

Other advantages and features will appear more clearly from the following description and from the non-limiting examples represented in the figures listed hereinbelow.

FIGURES

FIG. 1 is a diagram illustrating a SLM- or EBM-type additive manufacturing method.

FIG. 2 shows a micrograph of a cross-section of a sample Al10Si0.3Mg after surface scanning with a laser, cut and polished with two Knoop hardness indents in the re-melted layer.

DETAILED DESCRIPTION OF THE INVENTION

Unless stated otherwise, in the description:
the designation of the aluminum alloys is compliant with the nomenclature of The Aluminum Association;
the contents of the chemical elements are reported in % and represent weight fractions.

FIG. 1 generally describes an embodiment, wherein the additive manufacturing method according to the invention is implemented. According to this method, the filler material 25 is in the form of a powder of an alloy according to the invention. An energy source, for example a laser source of an electron source 31, emits an energy beam for example a laser beam or an electron beam 32. The energy source is coupled to the filler material by an optical system or electromagnetic lenses 33, the movement of the beam may thus be determined according to a digital model M. The energy beam 32 follows a movement according to the longitudinal plane XY, describing a pattern depending on the digital model M. The powder 25 is deposited on a support 10. The interaction of the energy beam 32 with the powder 25 causes a selective melting of the latter, followed by a solidification, resulting in the formation of a layer $20_1 \ldots 20_n$. Once a layer has been formed, it is covered with powder 25 of the filler metal and another layer is formed, superimposed on the layer made before. For example, the thickness of the powder forming a layer may be from 10 to 200 µm. Typically, this additive manufacturing mode is known under the name of selective laser melting (SLM) when the energy beam is a laser beam, the process being, in this case, advantageously carried out at atmospheric pressure, and under the name of electron beam melting (EBM) when the energy beam is an electron beam, the process being, in this case, advantageously carried out at a reduced pressure, typically lower than 0.01 bar and preferably lower than 0.1 mbar.

In another embodiment, the layer is obtained by selective laser sintering (SLS, or direct metal laser sintering, DMLS), the alloy powder layer according to the invention being selectively sintered according to the selected digital model with the thermal energy supplied by a laser beam.

In still another embodiment that is not described by FIG. 1, the powder is projected and molten simultaneously generally by a laser beam. This process is known under the name of laser melting deposition.

Other processes may be used, in particular those known under the names of Direct Energy Deposition (DED), Direct Metal Deposition (DMD), Direct Laser Deposition (DLD), Laser Deposition Technology (LDT), Laser Metal Deposition (LMD), Laser Engineering Net Shaping (LENS), Laser Cladding Technology (LCT), or Laser Freeform Manufacturing Technology (LFMT).

In one embodiment, the method according to the invention is used to make a hybrid part comprising a portion obtained by conventional rolling and/or spinning and/or molding and/or forging processes, optionally followed by machining, and a portion secured thereto obtained by additive manufacturing. This embodiment may also be suited for the repair of parts obtained by conventional processes.

In an embodiment of the invention, it is also possible to use the method according to the invention for the repair of parts obtained by additive manufacturing.

On completion of the formation of the successive layers, a raw part or part in the as built state is obtained.

The metallic parts obtained by the method according to the invention are particularly advantageous because they have a hardness in the as built state lower than that one of a 8009 reference, and at the same time a hardness after a heat treatment, in particular after a heat treatment for one hour at 400° C., higher than that one of a 8009 reference. The lower hardness in the as built state of the alloys according to the present invention in comparison with a 8009 alloy is considered to be advantageous for fitness to the SLM process, by inducing a lower stress level during the SLM manufacture and thus a lower sensitivity to hot cracking. The higher hardness after a heat treatment (for example 1h at 400° C.) of the alloys according to the present invention in comparison with a 8009 alloy results in a better thermal stability. The heat treatment may be a step of SLM post-manufacture hot isostatic pressing (HIP). Thus, the alloys according to the present invention are softer in the as built state but have a better hardness after heat treatment, and therefore better mechanical properties for the parts in operation.

Preferably, the Knoop hardness HK0.05 in the as built state of the metallic parts obtained according to the present invention ranges from 150 to 300 HK. Preferably, the Knoop hardness HK0.05 of the metallic parts obtained according to the present invention, after a hot treatment at least at 100° C. and at most at 500° C. and/or a hot isostatic pressing, for example after 1 h at 400° C., ranges from 150 to 250 HK. The protocol for measuring Knoop hardness is described in the examples hereinafter.

The powder according to the present invention may have at least one of the following characteristics:
average particle size from 5 to 100 µm, preferably from 5 to 25 µm, or from 20 to 60 µm.
The given values mean that at least 80% of the particles have an average size within the specified range;
spherical shape. For example, the sphericity of a powder may be determined using a morphogranulometer;
good castability. For example, the castability of a powder may be determined according to the standard ASTM B213 or the standard ISO 4490:2018. According to the standard ISO 4490:2018, the flow time is preferably shorter than 50 s;
low porosity, preferably from 0 to 5%, more preferably from 0 to 2%, still more preferably from 0 to 1% by volume. In particular, the porosity may be determined by scanning electron microscopy or by helium pycnometry (cf. The standard ASTM B923);
absence or small amount (less than 10%, preferably less than 5% by volume) of small particles (1 to 20% of the average size of the powder), called satellites, which stick to the larger particles.

The powder according to the present invention may be obtained by conventional atomization processes from an alloy according to the invention in a liquid or solid form or, alternatively, the powder may be obtained by mixing primary powers before exposure to the energy beam, the different compositions of the primary powders having an average composition corresponding to the composition of the alloy according to the invention.

It is also possible to add unmeltable, insoluble particles, for example oxides or $TiB_2$ particles or carbon particles, in the bath before atomization of the powder and/or during the deposition of the powder and/or during the mixture of the primary powders. These particles may serve to refine the microstructure. They may also serve to harden the alloy if these have a nanometric size. These particles may be present according to a volume fraction lower than 30%, preferably lower than 20%, more preferably lower than 10%.

The powder according to the present invention may be obtained for example by atomization by gas jet, plasma atomization, atomization by water jet, atomization by ultrasounds, atomization by centrifugation, electrolysis and spheroidization, or crushing and spheroidization.

Preferably, the powder according to the present invention is obtained by atomization by gas jet. The process of atomization by gas jet starts with casting of a molten metal through a nozzle. Afterwards, the molten metal is reached by neutral gas jets, such as nitrogen or argon, and atomized into very small droplets which cool down and solidify by falling inside an atomization tower. Afterwards, the powders are collected in a can. The process of atomization by gas jet has the advantage of producing a powder having a spherical shape, in contrast with the atomization by water jet which produces a powder having an irregular shape. Another advantage of atomization by gas jet is a good powder density, in particular thanks to the spherical shape and to the particle size distribution. Still another advantage of this process is a good repeatability of the particle size distribution.

After manufacture thereof, the powder according to the present invention may be oven-dried, in particular in order to reduce the humidity thereof. The powder may also be packaged and stored between the manufacture and the use thereof.

The powder according to the present invention may in particular be used in the following applications:

Selective Laser Sintering (SLS);
Direct Metal Laser Sintering (DMLS);
Selective Heat Sintering (SHS);
Selective Laser Melting (SLM);
Electron Beam Melting (EBM);
Laser Melting Deposition;
Direct Energy Deposition (DED);
Direct Metal Deposition (DMD);
Direct Laser Deposition (DLD);
Laser Deposition Technology (LDT);
Laser Engineering Net Shaping (LENS);
Laser Cladding Technology (LCT);
Laser Freeform Manufacturing Technology (LFMT);
Laser Metal Deposition (LMD);
Cold Spray Consolidation (CSC);
Additive Friction Stir (AFS);
Field Assisted Sintering Technology (FAST) or spark plasma sintering; or
Inertia Rotary Friction Welding (IRFW).

The invention will be described in more details in the example hereinafter.

The invention is not limited to the embodiments described in the description hereinbefore or in the examples hereinafter, and may vary widely within the scope of the invention as defined by the claims appended to the present description.

EXAMPLES

Two alloys according to the present invention, called Innov1 and Innov2, and a 8009 alloy of the prior art, have been cast in a copper mold using an Induthem VC 650V machine to obtain ingots with a 130 mm height, a 95 mm width and a 5 mm thickness. The composition of the alloys is given in weight fraction percentage in the following Table 1.

TABLE 1

| Alloys | Si | Fe | V | Ni | Zr | Cu |
|---|---|---|---|---|---|---|
| Reference (8009) | 1.8 | 8.65 | 1.3 | — | — | — |
| Innov1 | — | — | 1 | 6 | 1.5 | — |
| Innov2 | — | — | 1 | 6 | 2 | 5 |

The alloys as described in Table 1 hereinbefore have been tested by a rapid prototyping method. Samples have been machined for scanning of the surface with a laser, in form of strips having 60×22×3 mm dimensions, from the ingots obtained hereinbefore. The strips have been placed in a SLM machine and scans of the surface have been performed with a laser following the same scanning strategy and process conditions representative of those used for the SLM process. Indeed, it has been noticed that, in this manner, it was possible to assess the capability of the alloys of the SLM method and in particular the surface quality, the sensitivity to hot cracking, the hardness in the as built state and the hardness after heat treatment.

Under the laser beam, the metal melts in a bath having a 10 to 350 µm thickness. After passage of the laser, the metal rapidly cools down as in the SLM method. After laser scanning, a fine surface layer having a 10 to 350 µm thickness has molten and then solidified. The properties of the metal in this layer are close to the properties of the metal at the core of a part manufactured by SLM, because the scanning parameters are properly selected. Laser scanning of the surface of the different samples has been performed using a selective laser melting machine ProX300 of the trademark 3DSystems. The laser source had a 250 W power, the scattering vector was 60 µm, the scan speed was 300 mm/s and the diameter of the beam was 80 µm.

Knoop Hardness Measurement

Hardness is a major property for alloys. Indeed, if the hardness of the layer re-melted by scanning of the surface with a laser is high, a part manufactured with the same alloy would probably have a high tensile strength.

To assess the hardness of the re-melted layer, the strips obtained hereinbefore have been cut in the plane perpendicular to the direction of the passes of the laser and have been polished afterwards. After polishing, hardness measurements have been performed in the re-melted layer. The hardness measurement has been performed with a Durascan model apparatus from Struers. The 50 g Knoop hardness method with the large diagonal of the indent placed parallel to the plane of the re-melted layer has been selected to keep enough distance between the indent and the edge of the sample. 15 indents have been positioned at mid-thickness of the re-melted layer. FIG. 2 shows an example of the hardness measurement. The reference numeral 1 corresponds to the re-melted layer and the reference numeral 2 corresponds to a Knoop hardness indent.

The hardness has been measured according to Knoop's scale with a 50 g load after laser treatment (in the as built state) and after an additional heat treatment at 400° C. over variable durations, allowing assessing in particular the effect of a heat treatment or of a possible post-manufacture CIC treatment on the mechanical properties.

The Knoop hardness values HK0.05 in the as built state and after different durations at 400° C. are given in Table 2 hereinafter (HK0.05).

TABLE 2

| Alloy | As built state | After 1 h at 400° C. | After 4 h at 400° C. | After 10 h at 400° C. |
|---|---|---|---|---|
| Reference (8009) | 316 | 145 | 159 | 155 |
| Innov1 | 261 | 220 | 187 | 164 |
| Innov2 | 289 | 234 | 203 | 192 |

The alloys according to the present invention (Innov1 and Innov2) have shown a Knoop hardness HK0.05 in the as built state that is lower than that one of the 8009 reference alloy, but, after a heat treatment at 400° C., higher than that one of the 8009 reference alloy.

Table 2 hereinbefore clearly shows the better thermal stability of the alloys according to the present invention in comparison with the 8009 reference alloy. Indeed, the hardness of the alloy 8009 has considerably dropped as of the beginning of the heat treatment, and then plateaued. On the contrary, the hardness of the alloys according to the present invention has progressively decreased.

The invention claimed is:

1. A method for manufacturing a part including a formation of successive solid metallic layers, superimposed on one another, each layer describing a pattern defined from a digital model (M), each layer being formed by the deposition of a filler metal, the filler metal being subjected to an energy input so as to melt and constitute, when solidifying, said layer, wherein the filler metal is in the form of a powder, whose exposure to an energy beam results in melting followed by solidification so as to form a solid layer, wherein the filler metal is an aluminum alloy consisting of the following alloy elements:
   Ni, according to a weight fraction from 1 to 8%;
   Zr, according to a weight fraction from 0.3 to 3%;
   V, according to a weight fraction from 0.5 to 2%;
   optionally Cu, according to a weight fraction from 0 to 7%;
   optionally Fe, according to a weight fraction from 0 to 3%;
   optionally at least one element selected from: Si, Hf, Ti, Sc, Mg, Er, W, Nb, Ta, Y, Yb, Nd, Ce, Co, La, Mo and/or a mischmetal, according to a weight fraction lower than or equal to 5% for each one, and lower than or equal to 15% in total;
   optionally at least one element selected from: Sr, Ba, Sb, Bi, Ca, P, B, In and/or Sn, according to a weight fraction lower than or equal to 1% for each one, and lower than or equal to 2% in total;
   optionally at least one element selected from: Ag according to a weight fraction from 0.06 to 1%, Li according to a weight fraction from 0.06 to 1%, and/or Zn according to a weight fraction from 0.06 to 6%;
   optionally impurities according to a weight fraction lower than 0.05% (500 ppm) for each one and lower than 0.15% in total;
   the remainder consisting of aluminum.

2. The method according to claim 1, wherein the weight fraction of the at least one element selected from: Si, Hf, Ti, Sc, Mg, Er, W, Nb, Ta, Y, Yb, Nd, Ce, Co, La, Mo and/or a mischmetal, is lower than or equal to 3% for each one, and lower than or equal to 12% in total.

3. The method according to claim 1, wherein weight fraction of each element among Ce, a mischmetal, Mg, Mo, Sc, Er, Nb, Yb, Y, Ta, Nd, W, Co, La, Si and/or Zn is lower than 0.05% for each of these elements.

4. The method according to claim 1, wherein the weight fraction of the at least one element selected from: Sr, Ba, Sb, Bi, Ca, P, B, In and/or Sn, is lower than or equal to 0.1% for each one, and lower than or equal to 1% in total.

5. The method according to claim 1, wherein the aluminum alloy also comprises at least one grain refiner, according to an amount lower than or equal to 50 kg/ton for each one, and lower than or equal to 50 kg/ton in total.

6. The method according to claim 1, including, following formation of the layers,
   a solution heat treatment followed by quenching and tempering, or
   a heat treatment optionally at a temperature of at least 100° C. and at most 500° C.,
   and/or a hot isostatic pressing.

7. The method according to claim 1, wherein the aluminum alloy comprises from 2 to 7% Ni.

8. The method according to claim 1, wherein the aluminum alloy comprises from 0.5 to 2.5% Zr.

9. The method according to claim 1, wherein the aluminum alloy optionally comprises from 2 to 7% Cu.

10. The method according to claim 1, wherein the aluminum alloy optionally comprises from 0.5 to 3% Fe.

11. The method according to claim 3, wherein weight fraction of each element among Ce, a mischmetal, Mg, Mo, Sc, Er, Nb, Yb, Y, Ta, Nd, W, Co, La, Si and/or Zn is lower than 0.01% for each of these elements.

12. The method according to claim 4, wherein the at least one element selected from: Sr, Ba, Sb, Bi, Ca, P, B, In and/or Sn, has a weight fraction lower than or equal to 700 ppm for each one, and lower than or equal to 1% in total.

13. The method according to claim 5, wherein the at least one grain refiner comprises AlTiC and/or AlTiB2.

14. The method according to claim 5, wherein the amount of the at least one grain refiner is lower than or equal to 20 kg/ton for each one, and lower than or equal to 20 kg/ton in total.

15. The method according to claim 1, wherein the aluminum alloy comprises from 2 to 7% Cu.

* * * * *